3,657,274
PROCESS FOR PRODUCING N-ACYL 3,4-EPOXY-
PYRROLIDINE DERIVATIVES
Eiji Ohki and Sadao Oida, Tokyo, Japan, assignors to
Sankyo Company Limited, Chuo-ku, Tokyo, Japan
No Drawing. Filed June 11, 1969, Ser. No. 832,470
Claims priority, application Japan, June 12, 1968,
43/40,378
Int. Cl. C07d 27/04
U.S. Cl. 260—326.3                  2 Claims

ABSTRACT OF THE DISCLOSURE

N-acyl-3,4-epoxy pyrrolidine compounds are prepared by oxidation of N-acyl-3-pyrroline compounds with pertrifluoroacetic acid.

This invention relates to the novel production of heterocyclic rings. More particularly, the present invention pertains to the preparation of 3,4-epoxypyrrolidine derivatives.

Heretofore, with an aim to synthesize pyrrolidine derivatives having an epoxy ring in their molecules and which have a wide range of applications for the production of various organic compounds, attempts were made by treating 3-pyrroline derivatives with various oxidizing agents. However, there has not been accomplished a completely satisfactory result.

As a result of our investigations on a new and advantageous process for the production of 3,4-epoxypyrrolidine derivatives, it has been unexpectedly found that 3-pyrroline derivatives are converted into the corresponding 3,4-epoxides easily and in high yields when treated with pertrifluoroacetic acid, despite the fact that they do not react with such a common oxidizing agent as peracetic, perbenzoic or perphthalic acid. The present invention has been completed, based on the above finding.

It is therefore an object of the present invention to provide a new process for producing N-acyl-3,4-epoxypyrrolidine derivatives, characterized by oxidizing N-acyl-3-pyrroline derivatives with pertrifluoroacetic acid.

The process of the present invention is widely utilizable for the production of pyrrolidine derivatives and can be applied not only to such starting compounds as N-acyl-3-pyrroline derivatives having no substituent but also to those having in one or both of the 2- and 5-positions of the pyrroline ring a substituent which does not react with a common organic peracid, such as for example, an alkyl, aryl or aralkyl group. Further, said substituents, i.e. alkyl, aryl and aralkyl groups, may have substituents which will not take part in the present reaction, such as halogen atoms, alkoxy groups or alkyl groups. As the acyl groups employed for the protection of the nitrogen atom of the pyrroline ring, there may be used aliphatic or aromatic acyl groups which will not be affected by the oxidation reaction of the present invention. Examples of such acyl groups are acetyl, benzoyl, alkoxycarbonyl, aryloxycarbonyl, aralkoxycarbonyl and acylaminoacyl groups.

The present process is based upon a novel reaction as mentioned previously. Moreover, the epoxypyrrolidine derivative obtained according to the present process, e.g. the 1-carbobenzyloxy 2-p-methoxyphenylmethyl derivative, can be converted to the antibiotic anisomycin by treatment with trifluoroacetic acid, successive acetylation and hydrolysis followed by removal of the protecting group.

In practicing the present process, the above mentioned starting compound is mixed with pertrifluoroacetic acid in a suitable solvent, whereby the reaction progresses easily. Ordinarily, pertrifluoroacetic acid is freshly prepared in situ from trifluoroacetic anhydride and hydrogen peroxide. In order to neutralize the trifluoroacetic acid by-product, there is used a weak inorganic base, e.g. disodium hydrogen phosphate, sodium carbonate or the like. The reaction may be ordinarily effected at room temperature or below, but it may be satisfactorily carried out above said temperature. The reaction time required is usually about 30 minutes to 3 hours.

After completion of the reaction, the desired compound can be recovered according to an ordinary procedure from the reaction mixture. For example, after completion of the reaction, water is added to the reaction mixture, the organic layer is taken up, washed with water and then dried, the solvent is removed by distillation, and, if necessary, the residue is purified with chromatography using a silica gel column or by recrystallization, whereby the pure desired product can be obtained.

The process of the present invention will be further illustrated below with reference to examples.

EXAMPLE 1

Production of N-benzoyl-3,4-epoxypyrrolidine

To a suspension of 0.58 ml. of 90% hydrogen peroxide in 2.5 ml. of 1,2-dichloroethane is added with cooling 3.5 ml. of trifluoroacetic anhydride to prepare a pertrifluoroacetic acid solution. The pertrifluoroacetic acid solution thus prepared is added drop by dry to a mixture comprising 2 g. of N-benzoyl-3-pyrroline, 12 g. of disodium hydrogen phosphate and 16 ml. of 1,2-dichloroethane with stirring at 0° C. over a period of 30 minutes. After continuing the stirring at 0° C. for an additional 30 minutes, cold water is added and the mixture is allowed to stand for 1 hour. Subsequently, the organic layer is separated and the aqueous layer is extracted with chloroform. The extract is combined with the aforesaid organic layer and the mixture is washed with water. After drying the mixture with anhydrous sodium sulfate, the solvent is removed by distillation under reduced pressure to obtain 2.23 g. of a syrup, which is then allowed to stand to form crystalline substances. The substances are recrystallized from ethyl acetate to obtain the pure desired compound having a melting point of 66°–68° C.

*Elementary analysis.*—Calculated for $C_{11}H_{11}O_2N$ (percent): C, 69.82; H, 5.86; N, 7.40. Found (percent): C, 69.07; H, 5.98; N, 7.07.

EXAMPLE 2

Production of 1-benzoyl-2-(p-methoxyphenyl-methyl)-3,4-epoxypyrrolidine

To a solution of 5 g. of 1-benzoyl-2-(p-methoxyphenyl-methyl)-3-pyrroline in 50 ml. of dichloromethane is added 24 g. of disodium hydrogen phosphate, and the mixture is cooled. To this mixture is gradually added drop by drop with stirring a pertrifluoroacetic acid solution prepared in the same manner as in Example 1 from 1.2 ml. of a 90% hydrogen peroxide, 6 ml. of dichloromethane and 6.4 ml. of trifluoroacetic anhydride. The mixture is continuously stirred with cooling for 1 hour and then at room temperature for an additional 1 hour. Subsequently, the organic layer is separated and the aqueous layer is extracted with chloroform. The extract is combined with the aforesaid organic layer, and the mixture is washed with water. After drying with anhydrous sodium sulfate, the mixture is subjected to distillation under reduced pressure to obtain 5 g. of a syrup. This syrup is dissolved in benzene and is purified by column chromatography using 100 g. of silica gel. After elution with a 10:1 mixture of benzene and ether, the solvent of the eluate is removed by distillation to obtain 2.5 g. of the desired compound.

The compound thus obtained is recrystallized from methanol to give the pure desired product as needle-like crystals having a melting point of 109°–110° C.

*Elementary analysis.*—Calculated for $C_{19}H_{19}O_3N$ (percent): C, 73.76; H, 6.19; N, 4.53. Found (percent): C, 73.71; H, 6.23; N, 4.61.

EXAMPLE 3

Production of 1-benzyloxycarbonyl-2α-p-methoxyphenylmethyl-3α,4α-epoxypyrrolidine To a solution of 16.2 g. of 1-benzyloxycarbonyl-p-methoxyphenylmethyl-3-pyrroline in 60 ml. of dichloromethane is added 23 g. of powdery sodium carbonate and the mixture is heated under reflux. To this reaction mixture is added drop by drop with stirring over a period of 30 minutes a solution of pertrifluoroacetic acid prepared from 12 ml. of trifluoroacetic anhydride, 2.0 ml. of 90% hydrogen peroxide and 13 ml. of dichloromethane. Thereafter, the heating under reflux is continued with stirring for additional 1 hour. After cooling, the reaction mixture is subjected to filtration to separate solids contained therein which are then washed with a small amount of dichloromethane. These washings are combined with the filtrate previously obtained, and the mixture is subjected to distillation to remove the solvent, whereby 13.36 g. of a red oily substance is left. This substance is dissolved in benzene and is separated by column chromatography using 150 g. of silica gel. Initially, elution is effected by use of benzene to eluate the starting compound, whereby 4.18 g. of the starting compound is recovered. Subsequently, elution is effected by use of a 20:1 mixture of benzene and ether, whereby an α-epoxy derivative, which is the desired compound, is first eluated. Thereafter, a mixture of α- and β-epoxy, derivatives is eluted, and a β-epoxy derivative, which is an isomer, is eluted later. After distilling off the solvent from the eluate, the mixture of α- and β-epoxy derivatives is separated by further repeating the chromatography. The β-epoxy derivative is obtained as an oily substance while the α-epoxy derivative as crystals having a melting point of 58.5–61° C. The amounts of α- and β-epoxy derivatives obtained are 1.5 g. and 3.5 g. respectively.

*Elementary analysis.*—Calculated for $C_{20}H_{21}O_4N$ (percent): C, 70.78; H, 6.24; N, 4.13. Found (α): C, 70.44; H, 6.24; N, 4.19. (β): C, 70.61; H, 6.32; N, 4.23.

What is claimed is:

1. A process for the preparation of 1-benzyloxy-carbonyl - 2α - methoxyphenylmethyl-3α,4α-epoxypyrrolidine which comprises oxidizing 1-benzyloxycarbonyl-p-methoxyphenylmethyl-3-pyrroline with pertrifluoroacetic acid.

2. The process according to claim 8 wherein the pertrifluoroacetic acid is formed in situ from trifluoroacetic anhydride and hydrogen peroxide.

References Cited
UNITED STATES PATENTS 3,334,095   8/1967   Houlihan ---------- 260—244

ALEX MAZEL, Primary Examiner

J. A. NARCAVAGE, Assistant Examiner

U.S. Cl. X.R.

260—326.5 B, 326.5 D, 999